Patented Nov. 8, 1938

2,135,936

UNITED STATES PATENT OFFICE 2,135,936

PAINT AND PROCESS FOR PRODUCING THE SAME

David L. Gamble and Lester D. Grady, Jr., Palmerton, Pa., assignors to The New Jersey Zinc Company, New York, N. Y., a corporation of New Jersey No Drawing. Application August 24, 1935, Serial No. 37,774

11 Claims. (Cl. 134—39)

This invention relates to pigments and to paints prepared therefrom. More particularly, the invention is concerned with the preparation of thixotropic paints and to the treatment of pigments intended for use in such paints. The invention contemplates the production of a novel pigment and an improved thixotropic paint.

Throughout this specification and the appended claims the term "thixotropic" is employed to describe paints that tend to set to a relatively stiff or buttery consistency upon standing, but thin down to a relatively mobile liquid when mechanically agitated. This property has also been described as "false body".

The thixotropic character of a paint is preferably such that the shearing action of the brush used to apply the paint to a surface is sufficient to render the paint adequately mobile. When the thixotropic properties of a paint are properly adjusted, the paint leaving the brush remains fluid for a sufficient time to bring about good levelling, i. e., the brush marks disappear while the paint again sets to a stiff consistency before it has had time to run appreciably on the surface painted.

The thixotropic property in paints is a valuable one. It is especially desirable in flat paints intended to be applied to interiors with a brush, because it prevents the running of the paint and at the same time eliminates brush marks. Thixotropic paints possess a further advantage quite apart from their intended use for the reason that the paint acquires a buttery consistency upon standing in containers. Segregation or stratification of the paint during long periods of storage are thus prevented.

It has been proposed heretofore to produce thixotropic properties in paint by incorporating thereinto certain pigments containing calcium sulfate of a peculiar type, diluting the paint vehicle with oil or thinner, and treating the diluted paint with an aqueous solution of soap. The principal pigments proposed for imparting thixotropic properties to paints in the aforementioned process are composite pigments containing titanium dioxide and calcium sulfate.

The aforementioned process for the production of thixotropic paints has not been entirely successful. Two major difficulties have been encountered. In the first place, it has been difficult to predict in advance whether or not a given batch of paint would possess thixotropic properties at all. Secondly, it has been impossible to control the degree of thixotropy of paints prepared in this fashion with a reasonable degree of accuracy. When paints are prepared by the heretofore proposed method, the thixotropic character of the paint is apparently dependent upon some obscure property of the pigment employed or of the calcium sulfate in the pigment. It is probable that the inherent hydrophilic property of the pigment is the dominant factor, and this inherent hydrophilic property is apparently unequal in different lots of pigment which are otherwise identical. In any event, some paint prepared according to the aforementioned method possesses no thixotropic properties at all. Given two apparently identical lots of pigment, one may impart thixotropic properties to paint when used in connection with soap, whereas the other will be entirely inactive in this respect. Furthermore, one lot of pigment may be used to produce a paint having a desired degree of thixotropy, whereas the use of an apparently identical lot will result in a paint that is inadequately thixotropic. It is apparent that the lack of certainty as to the results obtainable by the aforementioned method has detracted seriously from its usefulness.

It is extremely difficult to produce satisfactory thixotropic paints without the use of calcium sulfate pigments. Thixotropic paints containing ordinary barium-base lithopone have been produced with the use of special vehicles and the addition of metallic soaps, such as linoleates of calcium or cobalt, but such paints are difficult to produce and generally have poor levelling properties.

As a result of our investigations, we have discovered that it is possible to produce commercially satisfactory thixotropic paints having good levelling properties without employing pigments containing calcium sulfate. Moreover, we have discovered a method whereby the degree of thixotropy of paints may be controlled with accuracy whether or not such paints contain calcium sulfate. Thirdly, our method results in imparting improved dry film hiding power to the paint.

We have discovered that oil vehicle paints containing water possess thixotropic properties when the pigment used in the paint is wetted by the water in such a way as to displace the oil from the surface of the pigment. Naturally, the oil vehicle used should not be of such a highly polar nature as to displace the water from the surface of the pigment particles.

On the basis of these discoveries, our invention contemplates coating the surfaces of pigment particles with a hydrophile substance that is substantially insoluble in an oil paint vehicle. The hydrophile substance preferably should be more easily wetted by water than by the oil paint vehicle. By "hydrophile" substance we mean a substance that tends to adsorb or absorb water so as to become wetter therewith. A substance may be considered substantially insoluble in an oil paint vehicle in the sense that the term is used herein when the oil paint vehicle does not dissolve or remove the substance from the surface of the pigment.

The pigment is dispersed or thoroughly incorporated into the oil paint vehicle under such conditions that the pigment becomes or remains wetted with water. Thus pigment particles coated with the hydrophile substance and wetted with a film of water become dispersed throughout the oil vehicle to form a paint which possesses thixotropic properties.

Among the hydrophile substances that we have found appropriate are gum arabic, Irish moss, agar-agar, gum tragacanth and dextrine. In the preferred practice of our invention we employ as a hydrophile substance the gums of the acacia such as those ordinarily called gum arabic, or gum acacia. Moreover, we prefer to select the so-called "water white" grade of gum arabic, in order to avoid any possible deleterious effect upon the texture, color or brightness of the pigments treated and of the paints into which such pigments are incorporated. Gum arabic ordinarily contains among other constituents metal salts of arabic acid, e. g., calcium and magnesium arabinates, the calcium salts predominating. It will be understood that other compounds, such as vegetable gums containing these salts or their equivalents may also be employed.

Practically any pigment may be used advantageously in the practice of the invention. Pigments such as those containing zinc or titanium or both and so-called inert pigments or extenders such as calcium sulfate, calcium carbonate, clay, silica and barium sulfate (blanc fixe) may be employed.

In the case of inert pigments that are themselves inherently hydrophile such as calcium sulfate, clay, silica, etc., treatment in accordance with the invention makes it possible to intensify and control the hydrophilic property so as to insure uniformity in respect to the thixotropic properties of paints prepared with the so-treated pigments in accordance with our invention. As previously indicated, thixotropic paints heretofore prepared with such inherently hydrophile inert pigments as calcium sulfate have tended to vary in thixotropic properties in an uncertain and troublesome manner.

Pigments that are not inherently hydrophile may be made susceptible to any desired degree of wetting by appropriately coating the pigment surfaces. It will be apparent that it is possible to intensify and control the hydrophilic property of coated pigments whether or not the untreated pigment is inherently hydrophile.

The hydrophile substance used in accordance with the invention should be applied to the pigment so that the surfaces of the pigment particles are coated therewith. This can be done by any convenient means of intimately admixing the hydrophile substance with the pigment. We prefer to apply the hydrophile substance, for example gum arabic, during the regular wet milling of the pigment, (if the pigment is subjected to such wet milling, as is ordinarily the case with pigments prepared by precipitation, such as lithopone). Thus, we have found it expedient to apply gum arabic while ball-milling wet lithopone. It is also possible to coat the pigment with the hydrophile substance by agitating an aqueous slurry of the pigment to which gum arabic or other hydrophile substance has been added.

When the pigment is coated with the hydrophile substance in the presence of excess water, the dispersing effect of the hydrophile substance is not sufficiently intense to create difficulties in the subsequent filtration or other water removal processes to which the slurry is subjected. Thus, lithopone which has been coated with a hydrophile substance while in the form of an aqueous slurry may thereafter be filter-pressed, dried, and disintegrated in the normal manner. The drying or other operation in which the coated pigment is subjected to heat should be conducted at a sufficiently low temperature to avoid decomposing or scorching the hydrophile substance used. In the case of gum arabic, the drying temperature of pigments coated therewith should not greatly exceed the boiling point of water and preferably should not exceed 110° C.

The amount of hydrophile agent to be added to the pigment depends in part upon the degree of body desired in the finished paint, upon the nature of the material treated, and upon the degree of thixotropy that is desired. In general, 1% or less by weight on the weight of the pigment will be sufficient. In most instances, 0.01 to 0.75% of hydrophilic substance per weight of the pigment employed is adequate. In the case of gum arabic, these proportions have proved to be particularly desirable.

When pigments having an inherent hydrophile tendency, such for example as titanium dioxide, zinc oxide, clay, calcium sulfate, and silica are employed, extremely small percentages of gum arabic may be sufficient. The incorporation of excessive amounts of gum arabic or other hydrophile substances may result in excessive stiffening of the paint.

The pigment which has been treated with the hydrophile substance in accordance with the invention may be incorporated into oil paint vehicles in any conventional manner that insures a thorough dispersion of the pigment in the vehicle.

The hydrophile substance may be applied first and the pigment may then be wetted with water before it is incorporated into the paint vehicle. Thus, the presence of water upon the surface of the pigment particles may be brought about by exposing the pigment to high humidity before incorporating it into the paint. In our preferred practice, however, the coated pigment prepared in accordance with our invention is ground dry into the paint vehicle, after which the paint is rendered thin by addition of oil or thinner, water being subsequently added and mixed into the paint. Irrespective of how the water is introduced into the paint about 1% of water on the volume of the paint is usually adequate.

In most cases, the presence of an emulsifying agent in the water facilitates its dispersion in the paint vehicle and the wetting of the pigment dispersed in said vehicle. Ordinary water-soluble soap, for example in 1% aqueous solution, forms a suitable emulsifying agent. Other materials, such as sodium carbonate (soda), borax, sulfonated oils, sulfonic acids, fatty alcohols, and the like may be employed as emulsifying agents in place of the soap. As previously indicated, the primary purpose of using an emulsifying agent is to enable the water to reach the pigment surface.

The paint vehicle selected to produce thixotropic paints should be only moderately polar. That is to say, it should not have such a high ability to wet the pigment as to displace from the pigment surface the water absorbed or adsorbed by the hydrophile substances with which the pigment is coated. An example of an oil vehicle with a suitable degree of polarity and wetting power for use in thixotropic paints in accordance with our invention is alkaline refined linseed oil combined with a conventional thinner, such as mineral spirits. Blown soya bean oil, on the other hand, possesses an excessively high degree of polarity and therefore it usually manifests too much of a tendency to displace water from the coated surfaces of the pigments. Appropriate commercial vehicles possessing a moderate degree of polarity or wetting power requisite for the preparation of thixotropic paints in accordance with our invention can be prepared by cooking China-wood oil or linseed oil or combinations of these oils with limed rosin or ester gum. Low acid number fish oils may also be used in the practice of the invention.

In general, oils with a high acid number are unsuited for use in the practice of our invention. However, oils with low acid number are not necessarily well suited to the practice of our invention because such oils may contain groups or radicals other than the acid or carboxyl radicals which are active in producing high polarity or wetting power. An oil vehicle having a polarity similar to that of alkaline refined linseed oil is generally suitable for use in preparing thixotropic paints in accordance with our invention. It will be apparent to the expert in the art that such a vehicle can be prepared from numerous oleaginous substances.

A satisfactory liquid from which to prepare thixotropic paints may be prepared as follows:

| | |
|---|---|
| Medium kettle bodied linseed oil___gallons__ | 45 |
| Limed rosin (8%)_____pounds__ | 100 |
| Mineral spirits_____gallons__ | 55 |

Cook linseed oil and rosin together to 565° F. (295° C.). Remove from fire and allow to cool. Thin and add liquid drier as desired.

To facilitate the practice of our invention, the following specific example is given, it being understood that the scope of our invention is in no way limited thereto:

*Preparation of pigment*

To 4000 pounds of partially milled, muffled lithopone slurry containing 35 per cent solids, add 4.9 pounds gum arabic (preferably dissolved in a small amount of water) and continue milling in the ball mill for one-half hour. Filter press and dry the material at 110° C. Disintegrate dry in a suitable disintegrator.

*Preparation of liquid*

| | Grams |
|---|---|
| Ester gum (acid No. 18)_____ | 900 |
| China-wood oil_____ | 700 |
| Medium bodied linseed oil_____ | 450 |
| Mineral spirits_____ | 1450 |

Mix the gum and oils together and heat the mixture to 296° C. Allow the mixture to cool to 200° C. and thin by adding the mineral spirits. Use the thinned liquid to prepare a paint vehicle of the following composition:

*Paint vehicle*

| | Per cent |
|---|---|
| Liquid_____ | 40.0 |
| Alkaline refined linseed oil_____ | 15.0 |
| Kerosene_____ | 20.0 |
| Mineral spirits_____ | 23.8 |
| Liquid drier_____ | 1.2 |
| | 100.0 |

*Preparation of paint*

Mix the pigment prepared as above with the paint vehicle prepared as above in the proportion of 250 parts by weight of pigment and 57 parts by weight of the vehicle. Grind this mixture through a buhrstone or roller mill to form a paint base.

In a suitable mixer reduce this base by adding thereto 94 parts by weight of the paint vehicle for every 300 parts by weight of the base.

When the mixing is complete and a smooth paint has been obtained, add to the paint 1.5 parts by weight of a 1% aqueous soap solution for every 394 parts by weight of the paint and mix the paint until the solution has become thoroughly incorporated therein. A proper degree of incorporation can usually be attained during five minutes of mixing.

The paint prepared as above will acquire a buttery consistency upon standing overnight and will manifest a suitable degree of thixotropy.

We claim:
1. A method of making a thixotropic paint which comprises wetting the pigment with an aqueous solution of a hydrophile substance selected from the group consisting of gum arabic, water soluble metal salts of arabic acid, gum tragacanth, Irish moss, agar-agar and dextrine, drying and disintegrating the wetted pigment below the decomposition temperature of the hydrophile substance to form a powder, and incorporating the powder in an oil paint vehicle in which the hydrophile substance is substantially insoluble and which wets the hydrophile substance less readily than does water, and wetting the powder particles with water.

2. A method of making a thixotropic paint which comprises incorporating in an oil paint vehicle water and a pigment having its surfaces coated with a hydrophile substance that is substantially insoluble in said paint vehicle and is more readily wetted by water than by the oil paint vehicle, said substance being selected from the group consisting of gum arabic, water soluble metal salts of arabic acid, gum tragacanth, Irish moss, agar-agar and dextrine.

3. A method of making a thixotropic paint which comprises incorporating into an oil paint vehicle water, an emulsifying agent, and a pigment having its surfaces coated with a hydrophile substance that is substantially insoluble in the oil paint vehicle and is more readily wetted by water than by the oil paint vehicle, said substance being selected from the group consisting of gum arabic, water soluble metal salts of arabic acid, gum tragacanth, Irish moss, agar-agar and dextrine.

4. A method of making a thixotropic paint which comprises incorporating into an oil paint vehicle a pigment having its surfaces coated with a hydrophile substance that is substantially insoluble in the oil paint vehicle and is more readily wetted by water than by the oil paint vehicle, and adding water containing an emulsifying agent to the resulting mixture of oil paint vehicle and coated pigment.

5. A method of making a thixotropic paint which comprises incorporating into an oil paint vehicle water containing an emulsifying agent, and also incorporating into the oil paint vehicle a pigment having its surfaces coated with a hydrophile substance selected from the group consisting of gum arabic, water soluble metal salts of arabic acid, gum tragacanth, Irish moss, agar-agar, and dextrine, said paint vehicle being insufficiently polar to displace a water film from said coated pigment surfaces.

6. A method of making a thixotropic paint which comprises dispersing a pigment surface-coated with a hydrophile substance selected from the group consisting of gum arabic, water soluble metal salts of arabic acid, gum tragacanth, Irish moss, agar-agar and dextrine in an oil paint vehicle in the presence of water and an emulsifying agent, said hydrophile substance being substantially insoluble in the oil paint vehicle and more readily wetted by water than by the oil paint vehicle.

7. A method of making a thixotropic paint which comprises dispersing in an oil paint vehicle a pigment surface-coated with a hydrophile substance that is substantially insoluble in the oil paint vehicle and is more readily wetted by water than by the oil paint vehicle, said substance being selected from the group consisting of gum arabic, water soluble metal salts of arabic acid, gum tragacanth, Irish moss, agar-agar and dextrine, and wetting the coated pigment particles with water.

8. A method of making uniformly thixotropic paint containing inherently hydrophile inert pigments which comprises dispersing in an oil paint vehicle said inert pigments surface-coated with a hydrophile substance that is substantially insoluble in the oil paint vehicle, and more readily wetted by water than by the oil paint vehicle and wetting the surfaces of the coated pigment with water, said substance being selected from the group consisting of gum arabic, water soluble metal salts of arabic acid, gum tragacanth, Irish moss, agar-agar and dextrine.

9. A thixotropic paint comprising an oil vehicle having dispersed therein a pigment surface-coated with a hydrophile substance selected from the group consisting of gum arabic water soluble metal salts of arabic acid, gum tragacanth, Irish moss, agar-agar, and dextrine, said surface-coated pigment being wetted with water and said paint vehicle being insufficiently polar to displace water from the surface of said surface-coated pigment and incapable of dissolving the coating from the pigment.

10. A thixotropic paint containing water in substantial quantities but less than about 1% of the volume of the paint, an oil vehicle, and a pigment surface-coated with a hydrophile substance and wetted with the water, said hydrophile substance being substantially insoluble in the oil vehicle and more readily wetted by water than by the oil vehicle and selected from the group consisting of gum arabic, water soluble metal salts of arabic acid, gum tragacanth, Irish moss, agar-agar and dextrine.

11. A method of making a thixotropic paint which comprises incorporating a pigment having particles coated with a hydrophile substance selected from the group consisting of gum arabic, water soluble metal salts of arabic acid, gum tragacanth, Irish moss, agar-agar and dextrine into an oil vehicle in which the hydrophile substance is substantially insoluble and which wets the hydrophile substance less readily than does water, and incorporating water into the resulting mixture in substantial amount but less than about 1% by volume of the paint.

DAVID L. GAMBLE.
LESTER D. GRADY, Jr.